United States Patent [19]

Siciliano et al.

[11] Patent Number: 5,426,895
[45] Date of Patent: Jun. 27, 1995

[54] WINDSHIELD WIPER BLADE CLEANER

[75] Inventors: Daniel J. Siciliano, Somerville; Peter J. Gazzara, Reading, both of Mass.

[73] Assignee: Procare, Inc., Woburn, Mass.

[21] Appl. No.: 18,914

[22] Filed: Feb. 17, 1993

Related U.S. Application Data

[63] Continuation of Ser. No. 708,244, May 31, 1991, abandoned.

[51] Int. Cl.6 .............................................. B24D 15/00
[52] U.S. Cl. ..................................... 451/523; 451/524; 451/540; 451/557; 451/558
[58] Field of Search ............. 51/204, 205 R, 205 WG, 51/391, 392, 394, 400, 401, 407; 30/124, 280, 289, 294, 293

[56] References Cited

U.S. PATENT DOCUMENTS

| | | | |
|---|---|---|---|
| 555,819 | 3/1896 | Johnston | 51/391 |
| 927,131 | 7/1909 | Dow | 51/205 WG |
| 1,195,880 | 8/1916 | Van Raden | 51/205 WG |
| 2,334,572 | 12/1941 | Melton | 51/400 |
| 2,763,105 | 3/1953 | Feeley | 51/400 |
| 2,973,577 | 3/1961 | Schekowski | 30/272 |
| 3,708,924 | 1/1973 | Prunchak | 51/396 |
| 3,862,522 | 1/1975 | Mednick | 51/400 |
| 3,886,657 | 6/1975 | Fabian | 30/294 |
| 4,617,765 | 10/1986 | Weiler | 51/205 WG |

FOREIGN PATENT DOCUMENTS

| | | | |
|---|---|---|---|
| 8700108 | 1/1987 | European Pat. Off. | 30/289 |
| 3635360 | 10/1986 | Germany . | |
| 2182550 | 5/1987 | United Kingdom . | |

*Primary Examiner*—Maurina T. Rachuba
*Attorney, Agent, or Firm*—Choate, Hall & Stewart

[57] ABSTRACT

A windshield wiper blade cleaning device is disclosed having a channel for receiving the tip of a wiper blade, the channel having a frictional base for removing dirt from the tip of the blade as the blade is drawn longitudinally through the channel. In an alternate embodiment, the channel also has frictional walls for cleaning the sides of the blade. In described embodiment, the base and/or walls are made frictional by means of projections, filaments, or abrasive materials.

15 Claims, 5 Drawing Sheets

WINDSHIELD WIPER BLADE CLEANER

This is a continuation of application Ser. No. 07/708,244, filed on May 31, 1991, abandoned.

BACKGROUND OF THE INVENTION

This invention relates to devices for cleaning the rubber blade of windshield wipers and other articles having a thin rubber blade such as squeegees.

In normal use, windshield wiper blades accumulate dirt which decreases the effectiveness of the blade in cleaning the windshield. This leads to streaking, and in severe cases, scratching of the windshield. Several methods have been used in the past to correct this problem, but none have met with total success. In one method, the wiper blade is trimmed as necessary, as disclosed in U.S. Pat. No. 2,973,577 and U.S. Pat. No. 3,886,657. This method raipidly diminishes the blade, requiring the entire blade to be replaced at frequent intervals. In another method, the sides of the blade are scraped to dislodge dirt, as disclosed in U.K. patent 2182550 and German patent 3635360. In U.K. patent 1182550, a device is disclosed wherein oppositely directed projections are engaged with opposite faces of the blade. As the blade is drawn longitudinally through the device, the blade is made to take a meandering path through the projections. During the course of this action, both the sides of the blade and the tip of the blade are scraped. However, particularly for blades having a blunt tip where the wiping action occurs at the corners of the tip, it appears that this device would be abusive to the blade, leading to deterioration of the wiping action. In German patent 3635360, a similar device is disclosed having a V-shaped groove whose sides form frictional surfaces embodied as parallel equidistant file teeth projecting from the surfaces. Again, it appears that this device would be abusive to the blade, particularly if the blade employs a blunt tip.

SUMMARY OF THE INVENTION

In one aspect, the invention is a wiper blade cleaning device featuring a channel having two smooth walls and a base. The channel has dimensions suitable for receiving at least a portion of a tip of a wiper blade. The base of the channel is frictional so that when the device is drawn longitudinally along the blade, the frictional base produces a scraping action on the tip of the blade, thereby cleaning the blade. The wiper blade cleaner is particularly appropriate for cleaning windshield wiper blades.

In preferred embodiments, the walls of the channel are approximately perpendicular to the base of the channel at their junction with the base. This design reflects the shape of the wiper blade and helps preserve the integrity of the blade during cleaning.

In some embodiments, a series of projections are disposed along the channel, each projection extending from one side of the channel to the other. In these embodiments, the device may be molded as a single piece of plastic.

In some embodiments, filaments are anchored to the base of the channel, forming a brush on the base of the channel. In particular embodiments, these filaments are fiberglass. Plastic or metal filaments may also be used.

In some embodiments, an abrasive material is adhered to the base of the channel. In particular embodiments, this material is a fiberglass fabric or an abrasive dense foam.

In another aspect, the device further includes frictional channel walls so that, when the device is drawn longitudinally along the blade, the frictional walls produce a scraping action on the sides of the blade. The walls can be made frictional by any of the means described above for making the base frictional. Furthermore, walls made frictional by any of these means can be used in combination with a base made frictional by any of these means, in any combination.

DESCRIPTION OF THE PREFERRED EMBODIMENT

Figure 1:
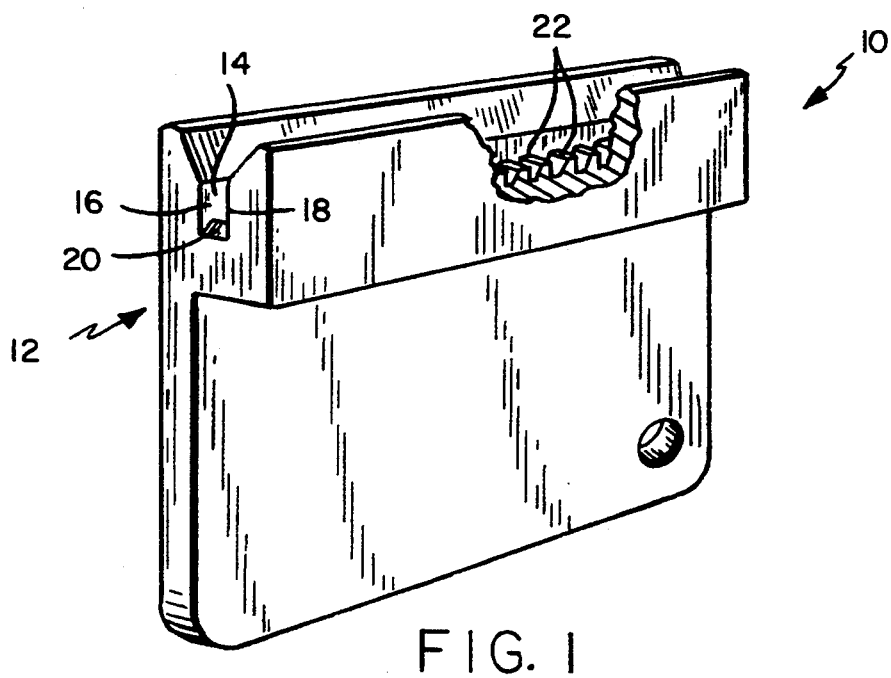
FIG. 1 is a view of a wiper blade cleaning device according to one embodiment of the invention, including a channel with a series of projections along the base.

One embodiment of a wiper blade cleaning device according to the invention is illustrated in FIG. 1. As shown, the device 10 includes a support 12 which is preferably conveniently hand-held. A channel 14 having two smooth sides 16 and 18 and a frictional base 20 forms part of the support 12. In the figure, one side 18 is partially cutaway to show the base 20 of the channel 14. In the embodiment shown, the base 20 includes a series of projections 22. In one embodiment, the entire device 10, including the series of projections 22 is formed of a single continuous piece of molded plastic.

Figure 2A:
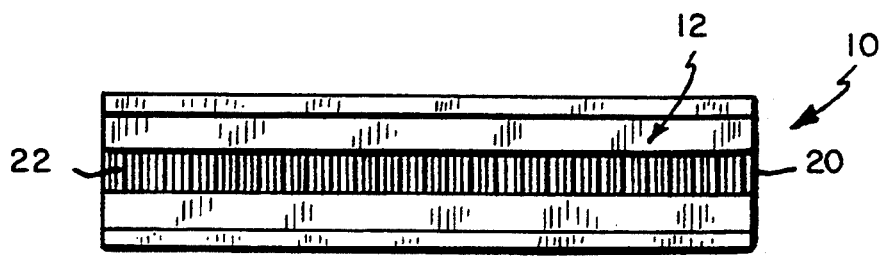
FIGS. 2a, 2b, and 2c are a top view, a cut-away side view, and an end view of the wiper blade cleaning device shown in FIG. 1.
Figure 2B:
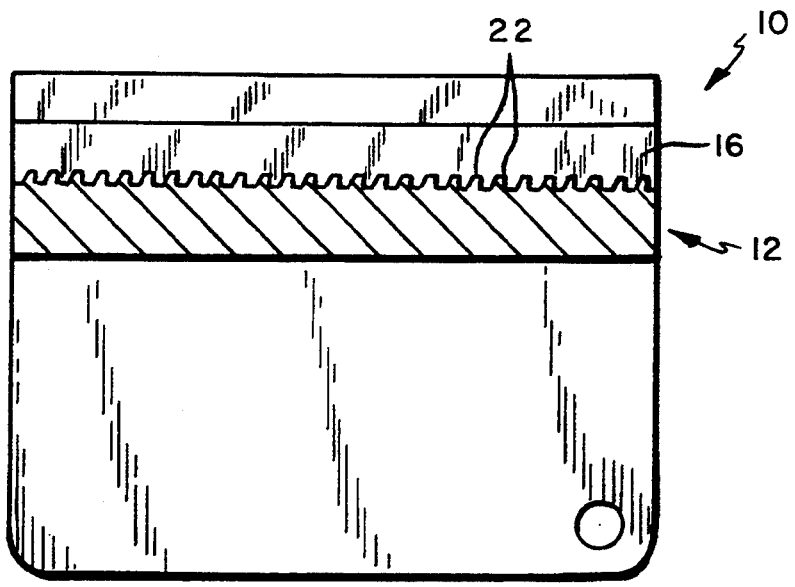
Figure 2C:
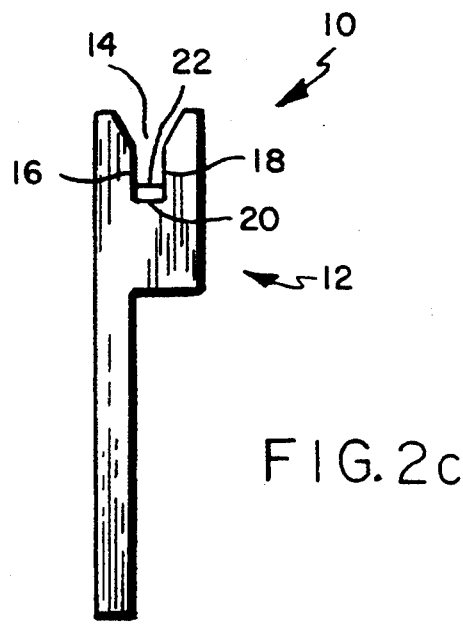

The embodiment of FIG. 1 is further illustrated in FIG. 2. FIG. 2a shows a top view of the cleaning device 10 and provides an unobstructed view of the projections 22. FIG. 2b shows a cutaway side view of the device 10 and provides a view of the cross-sections of the projections 22 in one embodiment. Other projection cross-sections are within the scope of the invention. FIG. 2c shows an end view of the cleaning device 10 and the cross section of the channel 14.

Figure 3:
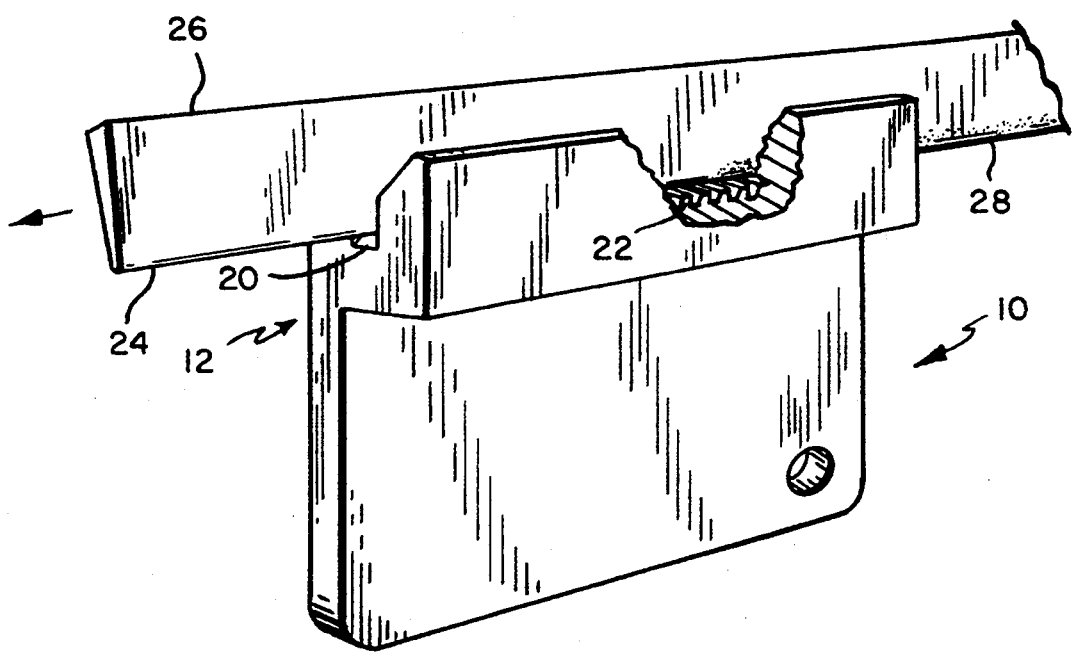
FIG. 3 is a view of a wiper blade engaged with the cleaning device of FIG. 1.

Use of the device illustrated in FIG. 1 is depicted in FIG. 3. As shown, the tip 24 of a wiper blade 26 is drawn longitudinally along the base 20 of the cleaning device 10. The projections 22 act to dislodge and remove dirt 28 from the tip 24 of the wiper blade 26. The device is particularly appropriate for cleaning blades employing a blunt tip, as illustrated in FIG. 3. In such blades, the cleaning action of the blade takes place at the corners formed by the sides of the blade and the blunt tip. Therefore, it is important that these corners not be damaged. As described above, it appears that the cleaning devices of the prior art would be abusive to these corners. The present invention, on the other hand, preserves the integrity of the blade.

Figure 4:
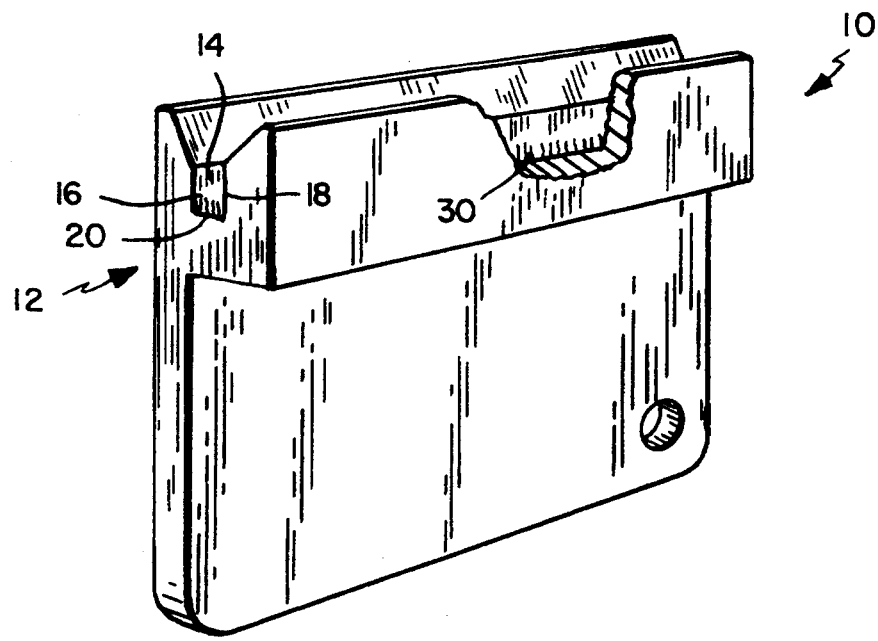
FIG. 4 is a view of another embodiment of a wiper blade cleaning device according to the invention, including a channel with filaments anchored in the base.

In an alternate embodiment of the invention, the projections illustrated in FIG. 1 are replaced with filaments 30 anchored in the base 20 of the channel, as illustrated in FIG. 4. Thus, the action of the frictional base is to brush the tip of the wiper blade. In a preferred embodiment, the filaments 80 are made of fiberglass. In alternate embodiments, the filaments 30 are made of plastic or metal.

Figure 5:
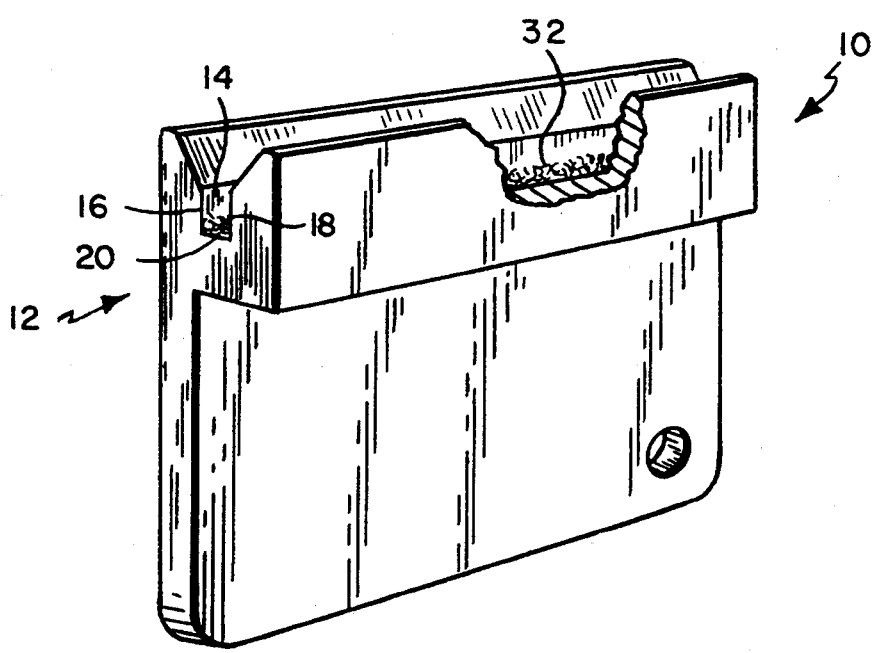
FIG. 5 is a view of yet another embodiment of a wiper blade cleaning device according to the invention, including a channel with abrasive material adhered to the base.

In yet another embodiment of the cleaning device, the projections illustrated in FIG. 1 are replaced with an abrasive material 32 adhered to the base 20 of the channel 14, as illustrated in FIG. 5. In preferred embodiments, the material 32 is a fiberglass fabric or a dense foam.

Figure 6:
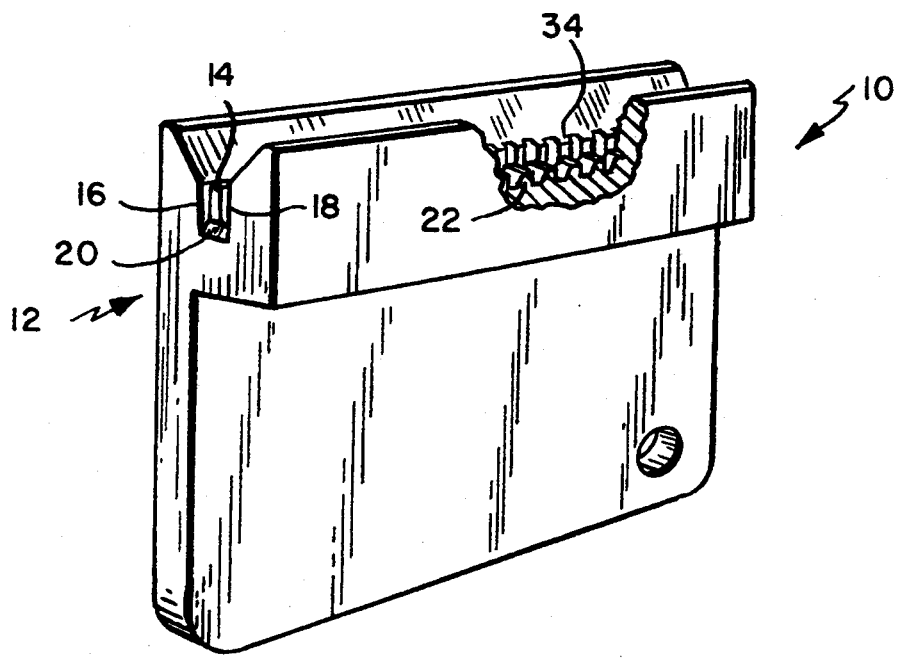
FIG. 6 ia a view of yet another embodiment of a wiper blade cleaning device according to the invention, including a channel with a series of projections along the base and sides.
Figure 7:
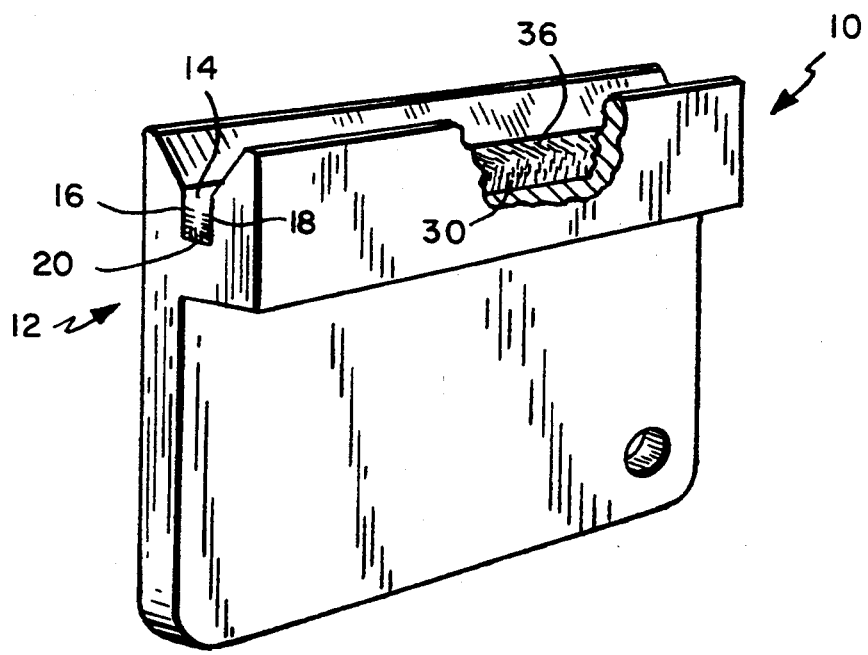
FIG. 7 is a view of yet another embodiment of a wiper blade cleaning device according to the invention, including a channel with filaments anchored to the base and sides.
Figure 8:
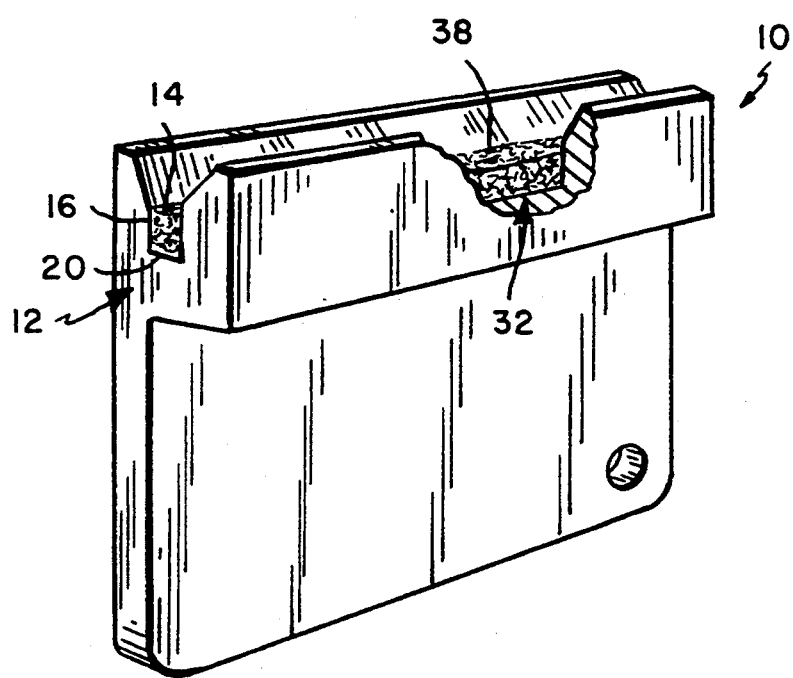
FIG. 8 is a view of yet another embodiment of a wiper blade cleaning device according to the invention, including a channel with abrasive material adhered to the base and sides.

In a variation of the embodiments described above, the sides 16 and 18 are also made fictional to provide a cleaning action on the sides of the wiper blade. This can be achieved in ways similar to those used to make the base 20 frictional. As shown in FIG. 6, a series of projections 34 can be disposed on sides 16 and 18. Alternatively, as illustrated in FIGS. 7 and 8, filaments 36 or abrasive materials 38 can be disposed on the sides 16 and 18.

It is recognized that variations and modifications of the present invention will occur to those skilled in the art, and it is intended that all such variations and modifications be included within the scope of the appended claims.

What is claimed is:

1. A wiper blade cleaning device comprising:
   a base element;
   two walls attached orthogonally to said base element in facing relationship, thus defining a channel of a certain width between said facing walls for engagement with a wiper blade, said channel having dimensions suitable for receiving at least a portion of an edge of said wiper blade, each said wall in facing relationship consisting of a first portion adjacent and orthogonal to said base element and a second portion remote from and non-orthogonal to said base element, said second wall portions directed away frown each other in a substantially V-shaped cross-section, said V-shaped cross-section having a width greater than any width between said first wall portions but not greater than the width of said base element; and
   friction means on at least a portion of the base element, said friction means comprising a plurality of projections disposed within said channel,
   whereby when said channel is engaged with a wiper blade and said device and wiper blade are moved relative to each other, said friction means produces a wiping action on the edge of said wiper blade, thereby cleaning without eroding said wiper blade.

2. The device of claim 1, further comprising a second plurality of projections, said second plurality of projections being disposed along at least a part of at least one facing wall, each said projection of said second plurality of projections extending into said channel and disposed substantially orthogonal to said base element.

3. The device of claim 1 wherein said friction means comprises a plurality of plastic projections extending from one side of the channel to the other.

4. The device of claim 3, being molded as a single piece of plastic.

5. A wiper blade cleaning device comprising:
   a base element;
   two walls attached orthogonally to said base element in facing relationship, thus defining a channel of a certain width between said facing walls for engagement with a wiper blade, said channel having dimensions suitable for receiving at least a portion of an edge of a wiper blade, each said wall in facing relationship consisting of a first portion adjacent and orthogonal to said base element and a second portion remote from and non-orthogonal to said base element, said second wall portions directed away from each other in a substantially V-shaped cross-section, said V-shaped cross-section having a width greater than any width between said first wall portions but not greater than the width of said base element; and
   friction means on at least a portion of said base element, said friction means comprising a plurality of filaments attached to said base element and extending substantially orthogonal to said base element and into said channel, thereby forming a brush on the base of said channel;
   whereby when said channel is engaged with a wiper blade and said device and wiper blade are moved relative to each other, said friction means produces a wiping action on the sides of said wiper blade, thereby cleaning without eroding said wiper blade.

6. The device of claim 5, further comprising a plurality of filaments attached to at least a portion of at least one facing wall, each said projection of said plurality of filaments extending into said channel and disposed substantially orthogonal to said at least one facing wall.

7. The device of claim 5, further comprising handle means integral with, and extending from, a surface of said base element.

8. The device of claim 5 wherein said fiction means comprises a plurality of fiberglass filaments.

9. The device of claim 5 wherein said friction means comprises a plurality of plastic filaments.

10. The device of claim 5 wherein said friction means comprises a plurality of metal filaments.

11. A wiper blade cleaning device comprising:
    a base element;
    two walls attached orthogonally to said base element in facing relationship, thus defining a channel of a certain width between said facing walls for engagement with a wiper blade, said channel having dimensions suitable for receiving at least a portion of an edge of said wiper blade, each said wall in facing relationship consisting of a first portion adjacent and orthogonal to said base element and a second portion remote from and non-orthogonal to said base element, said second wall portions directed away from each other in a substantially V-shaped cross-section, said V-shaped cross-section having a width greater than any width between said first wall portions but not greater than the width of said base element; and
    friction means on at least pan of at least one said wall, said friction means comprising a plurality of projections disposed along said part of said wall and extending into said channel, said device being arranged and constructed such that when said channel is engaged with a wiper blade and said device and wiper blade are moved relative to each other, said friction means produces a wiping action on the edge of said wiper blade, thereby cleaning without eroding said wiper blade.

12. The device of claim 11 wherein said friction means comprises a plurality of plastic projections and said device is molded as a single piece of plastic.

13. A wiper blade cleaning device comprising:
a base element;
two walls attached orthogonally to said base element in facing relationship, each said wall consisting of a first portion adjacent and orthogonal to said base element and a second portion remote from and non-orthogonal to said base element, said first portions being substantially parallel to one another and defining a channel having a cross-sectional dimension suitable for receiving at least a portion of an edge of said wiper blade, said second portions diverging from each other such that all cross-sectional dimensions defined by said second portions are greater than said cross-sectional dimension of said channel; and
friction means on at least a portion of the base element, said friction means comprising a plurality of projections disposed within said channel,
whereby when said channel of said device is engaged with a wiper blade and said device and wiper blade are moved relative to each other, said friction means produces a wiping action on the edge of said wiper blade, thereby cleaning without eroding said wiper blade.

14. A wiper blade cleaning device comprising:
a base element;
two walls attached orthogonally to said base element in facing relationship, each said wall consisting of a first portion adjacent and orthogonal to said base element and a second portion remote from and non-orthogonal to said base element, said first portions being substantially parallel to one another and defining a channel having a cross-sectional dimension suitable for receiving at least a portion of an edge of said wiper blade, said second portions diverging from each other such that all cross-sectional dimensions defined by said second portions are greater than said cross-sectional dimension of said channel; and
friction means on at least a portion of the base element, said friction means comprising a plurality of filament attached to said base element and extending substantially orthogonal to said base element and into said channel, thereby forming a brush on the base of the channel,
whereby when said channel of said device is engaged with a wiper blade and said device and wiper blade are moved relative to each other, said friction means produces a wiping action on the edge of said wiper blade, thereby cleaning without eroding said wiper blade.

15. A wiper blade cleaning device comprising:
a base element;
two walls attached orthogonally to said base element in facing relationship, each said wall consisting of a first portion adjacent and orthogonal to said base element and a second portion remote from and non-orthogonal to said base element, said first portions being substantially parallel to one another and defining a channel having a cross-sectional dimension suitable for receiving at least a portion of an edge of said wiper blade, said second portions diverging from each other such that all cross-sectional dimensions defined by said second portions are greater than said cross-sectional dimension of said channel; and
friction means on at least part of at least one said wall, said friction means comprising a plurality of projections disposed along said part of said wall and extending into said channel,
whereby when said channel of said device is engaged with a wiper blade and said device and wiper blade are moved relative to each other said friction means produces a wiping action on the edge of said wiper blade, thereby cleaning without eroding said wiper blade.

* * * * *

UNITED STATES PATENT AND TRADEMARK OFFICE
CERTIFICATE OF CORRECTION

PATENT NO. : 5,426,895
DATED : June 27, 1995
INVENTOR(S) : Daniel J. Siciliano, et al It is certified that error appears in the above-indentified patent and that said Letters Patent is hereby corrected as shown below:

Column 4, line 67: please delete "pan"; and insert therefor -- part --.
Column 6, line 40: please delete "other"; and insert therefor -- other, --.

Signed and Sealed this

Nineteenth Day of September, 1995

Attest:

BRUCE LEHMAN

Attesting Officer          Commissioner of Patents and Trademarks